Dec. 31, 1963  W. V. MARBACH  3,115,700
GUIDE ROD FOR SHIRRED CASINGS
Filed Dec. 29, 1960  2 Sheets-Sheet 1

INVENTOR.
WALTER V. MARBACH
BY
ATTORNEY

Dec. 31, 1963 W. V. MARBACH 3,115,700
GUIDE ROD FOR SHIRRED CASINGS
Filed Dec. 29, 1960 2 Sheets-Sheet 2

INVENTOR.
WALTER V. MARBACH
BY
ATTORNEY

United States Patent Office 3,115,700
Patented Dec. 31, 1963

3,115,700
GUIDE ROD FOR SHIRRED CASINGS
Walter V. Marbach, Palos Heights, Ill., assignor to Union Carbide Corporation, a corporation of New York
Filed Dec. 29, 1960, Ser. No. 79,209
5 Claims. (Cl. 29—283)

This invention relates to a guide rod for handling shirred casings, and more particularly, to a tapered guide rod for insertion into a shirred sausage casing to facilitate its quick and break-free removal from a shipping caddy containing a plurality of tightly packed shirred sausage casings, and transfer onto a meat emulsion stuffing horn.

In forming a sausage or like products, comminuted meat emulsion is fed under pressure through a stuffing horn and stuffed into casings and preferably cellulosic casings which have been shirred, compressed into sticks and successively sheathed onto the stuffing horn. To decrease the non-productive time between successive stuffing cycles, and substantially improve meat stuffing productivity, longer lengths of casings shirred with a large hole size are now being employed. For example, casings 150 feet in length and 24/32 inch in diameter are now being shirred and compressed to sticks of approximately 30 inches in length.

Although shirred and highly compressed casings are straight when placed in the shipping caddy, it has been found they have a tendency to expand and become slightly crooked during retention by the walls of the caddy. Thus, when the sausage maker attempts to release and remove one piece or stick of casing from the caddy, to sheath it onto a stuffing horn, the pleats of the compressed casing stick will often be separated at one or more places intermediate the supporting hands of the operator.

It is also difficult and time-consuming to sheath onto a close-fitting stuffing horn, a long length of shirred casing which has separated pleated portions. Thus, the anticipated efficiency in using the longer lengths of casings is not fully realized. Furthermore, the casing may be damaged by forcing it onto the horn over the separated pleated portions of the stick. Such damage may lead to complete rupture of the stuffed casing, either at the stuffing table or in subsequent processing operations. Casing breakage in a sausage kitchen is of course wasteful of labor and product.

It is an object of this invention to provide means for placing a shirred sausage casing onto a stuffing horn without separation of the shirred casing pleats.

Another object of this invention is to provide a guide rod, for quickly separating a long-length shirred casing from a group of similar casings compressed in a shipping caddy and guide it onto a stuffing horn.

Still another object of this invention is to provide a guide rod having a pilot extension which can be readily inserted into the discharge orifice of a stuffing horn and serve as an internal guide for the shirred casing to be transferred onto the full length of the stuffing horn.

Other and additional objects will become apparent hereinafter.

In accordance with the present invention, there is provided guide means and preferably a conically tapered rod, having a total length greater than the shirred casing stick and a maximum diameter less than the hole diameter of the shirred casing whereby the tapered guide rod can be readily inserted into the shirred casing, said maximum diameter being larger than the bore diameter of the stuffing horn orifice to prevent that portion of the tapered guide rod from entering into the stuffing horn, and a pilot extension connected to the maximum diameter end of the tapered guide rod, said extension having a reduced diameter such that it is insertable into the bore of the stuffing horn.

The tapered guide rod is insertable with the small end foremost into the hole of a shirred casing stick as it is exposed in an end-opened shipping caddy to support the casing stick throughout its length and promote its ready release from surrounding sticks in the caddy, without separation of the pleats of the shirred casing. The supported casing can then be transferred and guided onto a stuffing horn by inserting the pilot extension, at the large end of the tapered guide rod into the orifice of the stuffing horn to align the guide rod therewith such that the large end thereof abuts the orifice of the stuffing horn. The shirred casing is then readily and quickly transferred to the stuffing horn by sliding it from the guide rod, onto the stuffing horn. In such position, the casing is ready for the stuffing operation.

As the stuffing horn is usually filled with meat emulsion from the previous stuffing cycle which will resist the insertion of the pilot extension, the tapered guide rod includes means for permitting venting of meat emulsion displaced by said pilot extension.

In one embodiment of the invention the pilot extension and associated large end of the guide rod have a plurality of shallow axial grooves disposed about the periphery thereof to allow the meat emulsion inside the stuffing horn to be vented through the grooves when the pilot extension is inserted into the horn orifice.

In another embodiment, relief for displacing meat emulsion from the horn orifice as the pilot extension of the tapered guide rod is inserted therein, is provided by a passageway in the pilot extending from the end surface of the pilot extension to the guide rod surface located outside the horn orifice.

The nature of the invention and the manner in which it may be practiced will become clear from the detailed description when taken in conjunction with the accompanying drawings forming this specification and wherein.

Figure 1:
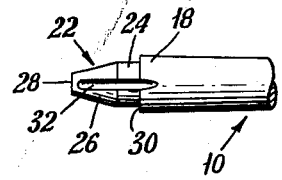
FIGURE 1 is a broken side elevation of guide means for a shirred casing stick in the form of a conically tapered rod.

Referring now to FIGURES 1, 2, 3 and 4 wherein is shown a guide means for the shirred casing sticks in the form of a conically tapered rod 10 made of a semi-rigid plastic material, such as a polyamdie sold by E. I. du Pont de Nemours & Co. under the trademark Zytel 101 or metal, leaf spring steel hardened to 28–34 Rockwell C scale and coated with a corrosion-resistant coating; and formed in a tapered length about 6 inches longer than the shirred casing stick 12 which is to be handled. Typically, for a 150 foot length of casing shirred and compressed to a stick of 30 inches, the guide rod is about 36 inches long.

The guide rod 10 includes a small or entry end 14 rounded to a diameter of about one-half the diameter of the hole 16 of the shirred casing stick 12, a large or doffing end 18 of a diameter equal to or slightly greater than the outside diameter of a stuffing horn 20 (see FIGURE 8), and a straight taper between the casing entry end 14 and doffing end 18. Extending from the doffing end 18 or base of the conically shaped guide rod 10 is a pilot extension 22.

Figure 3:
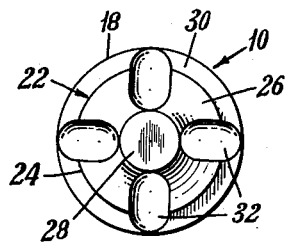
FIGURE 3 is an end view of the pilot extension of the guide rod shown in FIGURES 1 and 2.
Figure 2:
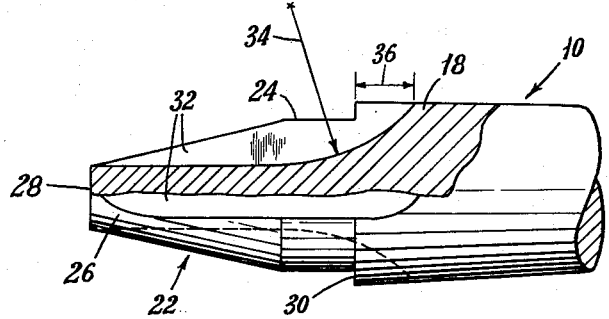
FIGURE 2 is an enlarged quarter-section of the pilot extension of the conically tapered guide rod shown in FIGURE 1.

The pilot extension 22 shown in FIGURES 1, 2 and 3 is positioned central to the doffing end 18 and includes a cylindrical horn-mating portion 24 integral with the conical guide rod base 18 shouldered to a diameter slightly less than the inside diameter of the stuffing horn 20 and is of a length about two-thirds thereof. The remaining section 26 of the pilot extension 22 is tapered to a rounded end 28 which is about one-quarter the inside diameter of the stuffing horn 20 and is about two times the length of the pilot extension mating portion 24. Adjoining and connecting the pilot extension mating portion 24 and the doffing end 18 is a cylindrical shoulder 30.

Figure 4:
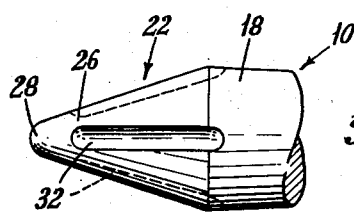
FIGURE 4 is a broken side elevation of the conically tapered guide rod provided with an alternate embodiment of the pilot extension.

In the alternate embodiment shown in FIGURE 4, the entire pilot extension 22 is conically tapered and its end integral with the guide rod base 18 is of a diameter equal thereto. As in the embodiment in FIGURES 1–3, the small end 28 of the pilot extension 22 is rounded to a diameter which is about one-quarter the inside diameter of the stuffing horn 20.

Extending from the pilot end 28 and into the doffing end 18 in either of the embodiments shown in FIGURES 1–4, are a plurality of shallow axial grooves 32 disposed around the periphery thereof. The grooves 32 can be made with a cutter having a radius 34, which is about the diameter of the shoulder 30 and a thickness slightly less than the diameter of pilot end 28, and are cut rearward of the shoulder 30 and into the doffing end 18, a distance 36 which is about one-quarter the diameter of the shoulder 30.

Figure 9:
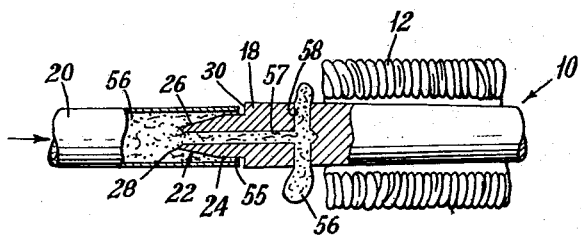
FIGURE 9 is an enlarged section of a portion of the casing and pilot extension of an alternate embodiment of a guide rod inserted into the orifice of a meat-filled stuffing horn.

In an alternate embodiment shown in FIGURE 9, the pilot extension 22 has a central bore 57 which extends axially into the doffing end 18 and is connected to a hole 58 extending transversely through the doffing end 18.

Figure 5:
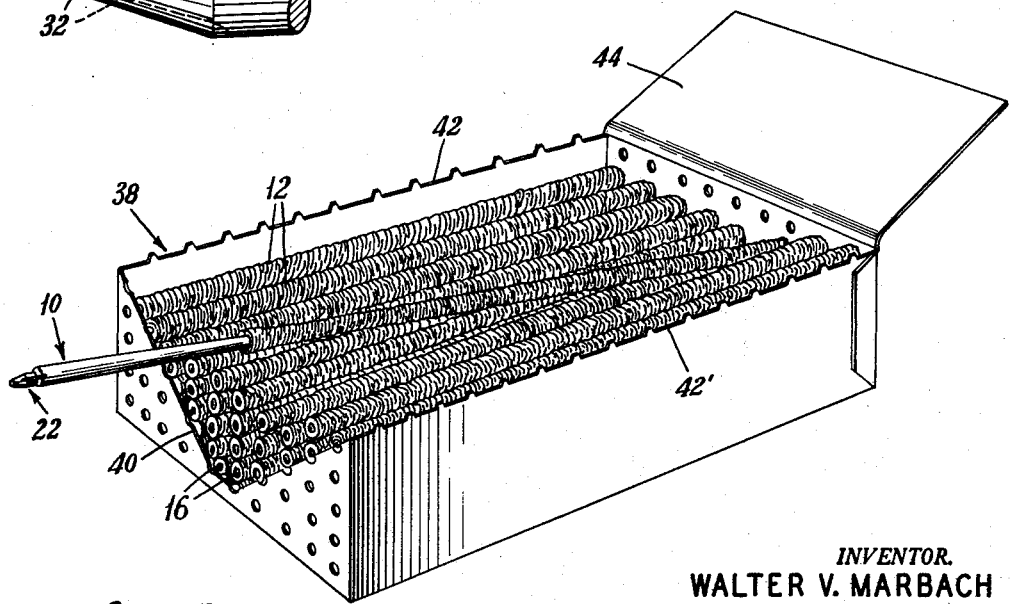
FIGURE 5 is a perspective of an opened caddy of shirred casings showing the tapered guide rod partially inserted into one casing.

Referring to FIGURE 5, a casing caddy 38 is shown opened in a manner enabling sheathing of a shirred casing onto a guide means, that is, after tearing out a V-shaped end portion 40 and both of the top side wall flaps along the lines of perforations 42, 42', and bending back end wall flap 44. In such manner, shirred casings 12 are exposed in the V-shaped opening 40 for ready insertion of the tapered guide rod 10 into a shirred casing hole 16.

Figure 7:
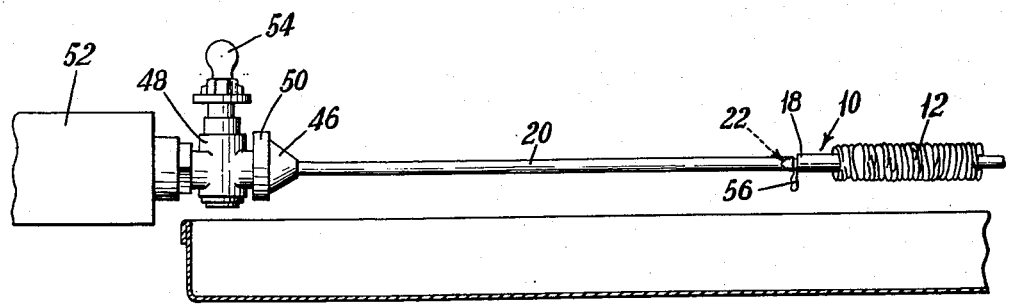
FIGURE 7 is a side elevation of a portion of a stuffing table, stuffing pot, stuffing horn and valve, with the pilot extension inserted into the orifice and casing sheathed on the tapered guide rod.

Referring now to FIGURE 7 there is shown a stuffing horn 20 having a conical section 46 at the input end fastened to the drownstream end of a valve 48 by a shouldered coupling 50. A stuffing pot 52 connected to the upstream end of the valve 48 contains the sausage meat emulsion under pressure, the flow of which is controlled by operating the valve 48 through its handle 54. Between stuffing cycles, the valve 48 is closed and the stuffing horn 20 is filled with meat emulsion 56 which resists the insertion of the pilot extension 22; however, this resistance is overcome by the venting means common to the pilot extension and the guide rod 10.

Figure 6:
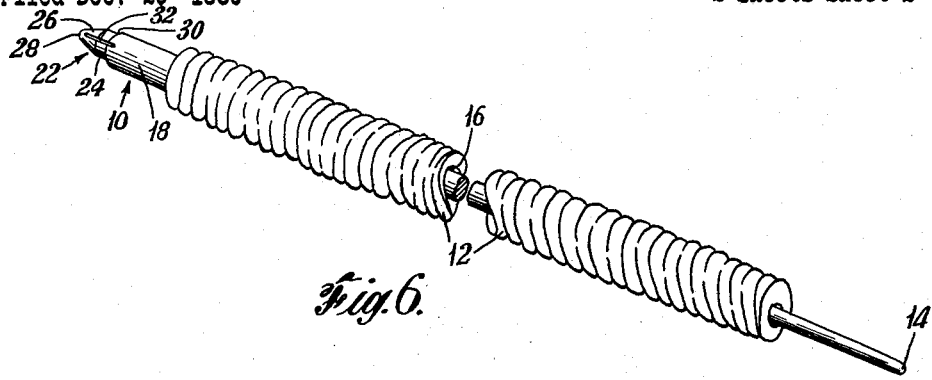
FIGURE 6 is a broken perspective of a shirred casing stick sheathed on the tapered guide rod.
Figure 8:
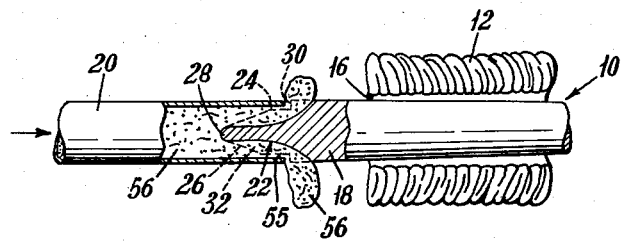
FIGURE 8 is an enlarged section of a portion of the casing and pilot extension of the guide rod inserted into the orifice of a meat-filled stuffing horn.

As shown in FIGURE 5, the conically tapered guide rod 10 is inserted into the hole 16 of an exposed shirred casing stick 12 in the caddy 38, substantially the entire length of the shirred casing stick 12 and both are readily removed from the caddy 38 without separating the shirred casing pleats. The shirred casing stick 12 after such removal from the caddy, is sheathed on the guide rod 10 as shown in FIGURE 6. The guide rod 10 with the shirred casing 12 thereon is then transferred to the orifice 55 of the stuffing horn 20 and the pilot extension 22 is inserted into the stuffing horn orifice 55 to center and align the guide rod 10 therewith, as shown in FIGURES 7, 8 and 9. In the embodiment shown in FIGURES 7 and 8, the meat emulsion 56, which fills the stuffing horn orifice 55 between stuffing cycles is displaced by the tapered section 26 of the pilot extension 22 and vented through the grooves 32 or its horn-mating portion 24 which aligns the guide rod 10 with the stuffing horn 20. In the alternate embodiment of the pilot extension 22, as shown in FIGURE 9, the displaced meat emulsion 56 is vented to the surface of the guide rod 10 through the central bore 57 of the pilot extension 22 and the connecting transverse hole 58 of the doffing end 18. In either embodiment, the vented meat emulsion 56 about the guide rod doffing end 18 is removed when the shirred casing 12 is thereafter transferred completely to the stuffing horn 20 and the guide rod 10 is removed to proceed with the normal stuffing operation. The operation is then repeated to transfer and guide successive shirred casing sticks 12 from the casing caddy 38 and onto the stuffing horn 20.

It is to be understood, artificial shirred casings other than cellulosic shirred casings, or animal shirred casings can be used, as well as shirred casing of shorter lengths than herein described and preferred.

It will be obvious to those skilled in the art that other changes may be made in the foregoing description without departing from the nature and spirit of the present invention.

What is claimed is:

1. A tapered guide rod for supporting a shirred sausage casing to facilitate its quick and break-free removal from a shipping caddy for shirred sausage casings and transfer onto a sausage meat stuffing horn, wherein the tapered guide rod has a length greater than said shirred casing and is insertable therethrough with the small end of the tapered guide rod foremost, the large end of the guide rod is at least as large as the outside diameter of the stuffing horn and less than the inner diameter of the shirred casing, said guide rod large end includes a pilot extension and an adjoining shoulder and wherein said pilot is insertable in said stuffing horn up to the adjoining shoulder to align the tapered guide rod with said stuffing horn, and means common to the pilot and the rod large end for removing the meat emulsion in the stuffing horn which has been displaced by the pilot extension.

2. A conically tapered guide rod for supporting a shirred sausage casing to facilitate its quick and break-free removal from a shipping caddy containing a plurality of such shirred sausage casings and transfer onto a sausage meat emulsion stuffing horn wherein the tapered guide rod has a length greater than said shirred casing, and includes a small rounded end which is foremost as the tapered guide rod is inserted through said sausage casing, a large end which has a diameter at least as great as the outside diameter of the stuffing horn and less than the inner diameter of said shirred casing, a pilot extension which extends from the base of the conically tapered guide rod and has a diameter less than the inner diameter of the stuffing horn and thereby forms an adjoining shoulder between the large end and said pilot extension, and wherein said pilot extension is insertable in the stuffing horn up to said adjoining shoulder to align said guide rod with said stuffing horn, and means common to the pilot and the rod large end for venting meat emulsion in the stuffing horn displaced by the pilot.

3. A conically tapered guide rod for supporting a shirred sausage casing to facilitate its quick and break-free removal from a shipping caddy containing a plurality of such shirred sausage casings and transfer onto a sausage meat emulsion stuffing horn, wherein the conically tapered guide rod has a length greater than said shirred casing, and includes a small rounded end which is foremost as the tapered guide is inserted through said shirred sausage casing, a larger end which has a diameter at least as great as the outside diameter of the stuffing horn and less than the inner diameter of said shirred casing, a conically tapered pilot extending from said guide rod large end which is insertable in said stuffing horn to align the guide rod therewith, and means common to said pilot and guide rod large end for venting the meat emulsion displaced by the insertion of said pilot in the stuffing horn.

4. A tapered guide rod for supporting a shirred sausage casing to facilitate its quick and break-free removal from a shipping caddy containing a plurality of such shirred sausage casings and transfer onto a sausage meat emulsion stuffing horn, wherein the tapered guide rod has a length greater than said shirred casing, and includes a small rounded end which is foremost as the tapered guide is inserted through said shirred sausage casing, a large end having a diameter at least as great as the outside diameter of the stuffing horn and less than the inner diameter of said shirred casing, a pilot extension having a cylindrical horn-mating portion extending from said guide rod large end and a tapered portion extending from said horn-mating portion, a shoulder adjoining the pilot horn-mating portion and the guide rod large end, and wherein said pilot extension is insertable in said stuffing horn up to said adjoining shoulder, said pilot extension and large end portion adjacent thereto having a plurality of axial grooves disposed around the periphery thereof for venting meat emulsion displaced by the insertion of the pilot extension in the stuffing horn.

5. A conically tapered guide rod for supporting a shirred sausage casing to facilitate its quick and break-free removal from a shipping caddy containing a plurality of such shirred sausage casings and transfer onto a sausage meat emulsion stuffing horn, wherein the tapered guide rod has a length greater than said shirred casing, and includes a small rounded end which is foremost as the tapered guide is inserted through said shirred sausage casing, a large end having a diameter at least as great as the outside diameter of the stuffing horn and less than the inner diameter of said shirred casing, a pilot extension having a cylindrical horn-mating portion extending from said guide rod large end and a tapered portion extending from said horn-mating portion, a shoulder adjoining the pilot horn-mating portion and said guide rod large end, and wherein said pilot extension is insertable in said stuffing horn up to said shoulder, said pilot extension has a longitudinal bore therethrough which extends into the large end of the guide rod and wherein said large end has a transverse hole therethrough which connects said bore to the guide rod surface for venting meat emulsion displaced by the insertion of the pilot in the stuffing horn.

References Cited in the file of this patent

UNITED STATES PATENTS

| | | |
|---|---|---|
| 1,936,961 | Burge | Nov. 28, 1933 |
| 2,388,309 | Curtiss | Nov. 3, 1945 |
| 2,646,592 | Kennedy | July 28, 1953 |
| 2,702,926 | Rahaim | Mar. 1, 1955 |